US012240225B2

(12) United States Patent
Katagami et al.

(10) Patent No.: US 12,240,225 B2

(45) Date of Patent: Mar. 4, 2025

(54) PRINTING APPARATUS

(71) Applicant: SEIKO EPSON CORPORATION, Tokyo (JP)

(72) Inventors: Satoru Katagami, Matsumoto (JP); Hiroshi Toyama, Shiojiri (JP); Yuichi Washio, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 168 days.

(21) Appl. No.: 18/185,896

(22) Filed: Mar. 17, 2023

(65) Prior Publication Data

US 2023/0294421 A1 Sep. 21, 2023

(30) Foreign Application Priority Data

Mar. 18, 2022 (JP) ................................ 2022-043552

(51) Int. Cl.
*B41J 11/00* (2006.01)
*C23C 18/54* (2006.01)

(52) U.S. Cl.
CPC ........ *B41J 11/0024* (2021.01); *B41J 11/0022* (2021.01); *B41J 11/007* (2013.01); *C23C 18/54* (2013.01)

(58) Field of Classification Search
CPC .... B41J 11/0022; B41J 29/38; B41J 11/0024; B41J 11/002; B41J 15/04; B41J 11/007; B41J 11/00244; B41J 15/16; C23C 18/54
See application file for complete search history.

(56) References Cited

U.S. PATENT DOCUMENTS 11,173,727 B2 11/2021 Toyama et al.
2020/0384781 A1* 12/2020 Toyama ................. B41J 11/002
2021/0229458 A1* 7/2021 Asamoto ................ B41J 11/002

FOREIGN PATENT DOCUMENTS

JP 2020-199660 A 12/2020

* cited by examiner

*Primary Examiner* — Jannelle M Lebron

(74) *Attorney, Agent, or Firm* — WORKMAN NYDEGGER

(57) ABSTRACT

A drying unit includes a first contact heating unit provided inside a housing, and a second contact heating unit provided downstream in a transport direction from the first contact heating unit inside the housing. The first contact heating unit includes a first contact heating surface configured to come into contact with a back surface of a medium after printing. The second contact heating unit includes a second contact heating surface configured to come into contact with the back surface of the medium after printing. The first contact heating surface is curved to have a shape protruding in a direction opposite to the second contact heating surface, and the second contact heating surface is curved to have a shape protruding in a direction opposite to the first contact heating surface. The first contact heating surface has a radius of curvature larger than that of the second contact heating surface.

10 Claims, 3 Drawing Sheets

PRINTING APPARATUS

The present application is based on, and claims priority from JP Application Serial Number 2022-043552, filed Mar. 18, 2022, the disclosure of which is hereby incorporated by reference herein in its entirety.

BACKGROUND

1. Technical Field

The present disclosure relates to a printing apparatus that performs printing on a medium by discharging liquid onto the medium, and dries the medium after printing.

2. Related Art

For example, JP-A-2020-199660 discloses a printing apparatus that performs printing on a medium by discharging liquid onto the medium transported in a transport direction. The printing apparatus includes a drying unit that dries the medium after printing. As such a drying unit, there is a drying unit that includes a housing, and a contact heating unit provided inside the housing. The contact heating unit dries the medium after printing by coming into contact with the medium after printing.

However, in such a printing apparatus, there is a possibility that quality of the medium after printing may deteriorate in association with the drying of the medium after printing by the contact with the contact heating unit.

SUMMARY

A printing apparatus for solving the above problem includes a transport unit configured to transport a medium in a transport direction, a printing unit configured to perform printing on the medium by discharging liquid onto the medium transported by the transport unit, and a drying unit configured to dry the medium after printing on which printing was performed by the printing unit, wherein the drying unit includes a housing, a first contact heating unit provided inside the housing, and a second contact heating unit provided downstream in the transport direction from the first contact heating unit inside the housing, the first contact heating unit includes a first contact heating surface facing a back surface of the medium after printing and configured to come into contact with the back surface of the medium after printing, the back surface of the medium after printing being opposite to a printing surface of the medium after printing, the second contact heating unit includes a second contact heating surface facing the back surface of the medium after printing and configured to come into contact with the back surface of the medium after printing, the transport unit includes a folding unit provided downstream in the transport direction from the first contact heating unit and upstream in the transport direction from the second contact heating unit, the folding unit is configured to fold the medium after printing coming into contact with the first contact heating surface to the second contact heating surface, the first contact heating surface and the second contact heating surface are surfaces facing in directions opposite to each other, the first contact heating surface is curved to have a shape protruding in a direction opposite to the second contact heating surface, the second contact heating surface is curved to have a shape protruding in a direction opposite to the first contact heating surface, and the first contact heating surface has a radius of curvature larger than that of the second contact heating surface.

DESCRIPTION OF EXEMPLARY EMBODIMENTS

First Exemplary Embodiment

An exemplary embodiment of a printing apparatus will be described below with reference to the accompanying drawings. In the following description, a short direction of a medium M is referred to as a width direction X, and a direction intersecting (e.g., orthogonal) the width direction X and a vertical direction Z is referred to as a longitudinal direction Y. One side of the width direction X is referred to as a first width direction X1, and another side of the width direction X is referred to as a second width direction X2. One side of the longitudinal direction Y is referred to as a first longitudinal direction Y1, and another side of the longitudinal direction Y is referred to as a second longitudinal direction Y2. An upper side of the vertical direction Z is referred to as an upside Z1, and a lower side of the vertical direction Z is referred to as a downside Z2. Also, a direction in which the medium M is transported is referred to as a transport direction D.

Configuration of Printing Apparatus 10

Figure 1:
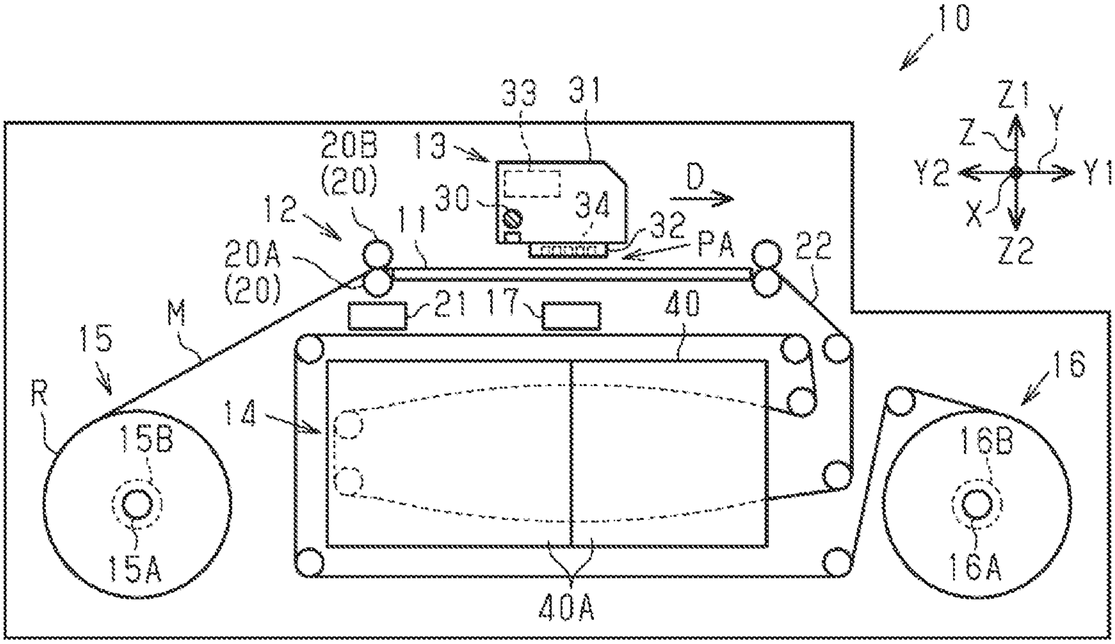
FIG. 1 is a front view schematically illustrating a printing apparatus.

As illustrated in FIG. 1, the printing apparatus 10 may be a roll-to-roll type printing apparatus, for example. The roll-to-roll type printing apparatus performs printing on the medium M as a continuous sheet. The printing apparatus 10 may be a printer that performs printing on a label sheet as the medium M. The printing apparatus 10 may be a serial printing type inkjet printer.

The printing apparatus 10 includes a support portion 11, a transport unit 12, and a printing unit 13. The support portion 11 is configured to support the medium M. In particular, the support portion 11 supports the medium M transported by the transport unit 12, in a printing area PA where printing is performed by the printing unit 13.

The printing apparatus 10 may include a feeding unit 15. The feeding unit 15 feeds the medium M. The feeding unit 15 includes a support shaft 15A, and a feeding motor 15B. The support shaft 15A rotatably supports a roll body R in which the medium M is wound into a roll shape. The feeding motor 15B is a power source that rotates the support shaft 15A. In the feeding unit 15, the support shaft 15A is rotated by driving of the feeding motor 15B, and thus the long medium M is fed from the roll body R.

The transport unit 12 is configured to transport the medium M in the transport direction D. The transport unit 12 transports the medium M fed by the feeding unit 15 in the transport direction D. The transport unit 12 includes a transport roller pair 20, and a transport motor 21. The transport roller pair 20 is provided upstream the printing unit 13 in the transport direction D. The transport roller 20 includes a transport driving roller 20A, and a transport driven roller 20B. The transport driving roller 20A is rotatable by driving of the transport motor 21. The transport driven roller 20B corotates with rotation of the transport driving roller 20A to rotate. The transport motor 21 is a power source of the transport driving roller 20A. The transport unit 12 transports the medium M fed from the feeding unit 15 in the transport direction D in a state of nipping the medium M, by the transport driving roller 20A rotating by driving of the transport motor 21. In this manner, the transport unit 12 is configured to transport the medium M in the transport direction D along a transport path 22. That is, the printing apparatus 10 includes the transport path 22 through which the medium M is transported.

The printing apparatus 10 may include a winding unit 16. The winding unit 16 winds the medium M after printing in a roll shape. The winding unit 16 includes a winding shaft 16A and a winding motor 16B. The winding shaft 16A supports the medium M after printing. The winding motor 16B is a drive source of the winding shaft 16A. The winding unit 16 winds the medium M by the winding shaft 16A rotating by driving of the winding motor 16B. The winding unit 16 may include a tension applying unit that applies tension to the medium M after printing.

The printing unit 13 is configured to perform printing on the medium M supported by the support portion 11. The printing unit 13 includes a guide shaft 30, a carriage 31, a liquid discharging head 32, and a carriage motor 33. The guide shaft 30 is provided along the width direction X. The carriage 31 is supported by the guide shaft 30. The carriage 31 supports the liquid discharging head 32. The carriage 31 is scanned along the axial direction of the guide shaft 30 by driving of the carriage motor 33. That is, the carriage 31 is scanned along the width direction X.

The liquid discharging head 32 is provided on the lower Z2 side in the vertical direction Z of the carriage 31. The liquid discharging head 32 includes a plurality of nozzles 34 from which liquid is discharged. The plurality of nozzles 34 open toward the medium M supported by the support portion 11. The liquid discharging head 32 discharges the liquid from the plurality of nozzles 34 toward the medium M supported by the support portion 11. In this way, the printing unit 13 is configured to perform printing on the medium M by discharging the liquid onto the medium M transported by the transport unit 12.

The liquid discharging head 32 is of a serial head type that discharges the liquid as the carriage 31 moves in the width direction X, but may be of a line head type. For example, the liquid may be ink, for example. The liquid may have, for example, one type of color or a plurality of types of colors.

In this manner, the printing apparatus 10 performs printing on the entire medium M, by alternately performing transport operation and printing operation. The transport operation is operation of causing the transport unit 12 to transport the medium M. The printing operation is operation of causing the liquid discharging head 32 to jet the liquid onto the medium M supported by the support portion 11 while reciprocating the carriage 31.

The printing apparatus 10 includes a drying unit 14. The drying unit 14 is positioned downstream the printing unit 13 in the transport direction D. The drying unit 14 is configured to dry the medium M after printing by the printing unit 13. The drying unit 14 includes a housing 40. The transport path 22 passes through inside the housing 40.

The housing 40 may include a swing door 40A. The swing door 40A is provided on the first width direction X1 side of the housing 40. In a state where the swing door 40A of the drying unit 14 is closed, the medium M transported through the transport path 22 can be dried. In a state where the swing door 40A of the drying unit 14 is open, the medium M can be installed inside the housing 40 by a user. In the state where the swing door 40A of the drying unit 14 is open, an inside of the housing 40 can be maintained by the user.

The printing apparatus 10 includes a control unit 17. The control unit 17 may comprehensively control the printing apparatus 10, and may control various types of operation performed in the printing apparatus 10. In particular, the control unit 17 can control the transport unit 12, the printing unit 13, the drying unit 14, the feeding unit 15, and the winding unit 16. That is, the control unit 17 is configured to perform control related to printing on the medium M. The control unit 17 may include one or more processors that perform various processes according to a program, one or more dedicated hardware circuits, such as an application-specific integrated circuit, that performs at least some of the various processes, or a combination thereof. The processor includes a CPU and a memory such as RAM and ROM, and the memory stores a program code or a command configured to cause the CPU to perform the process. The memory, that is, a computer-readable medium includes all kinds of readable media accessible by a general purpose or dedicated computer.

Configuration of Drying Unit 14

Figure 2:
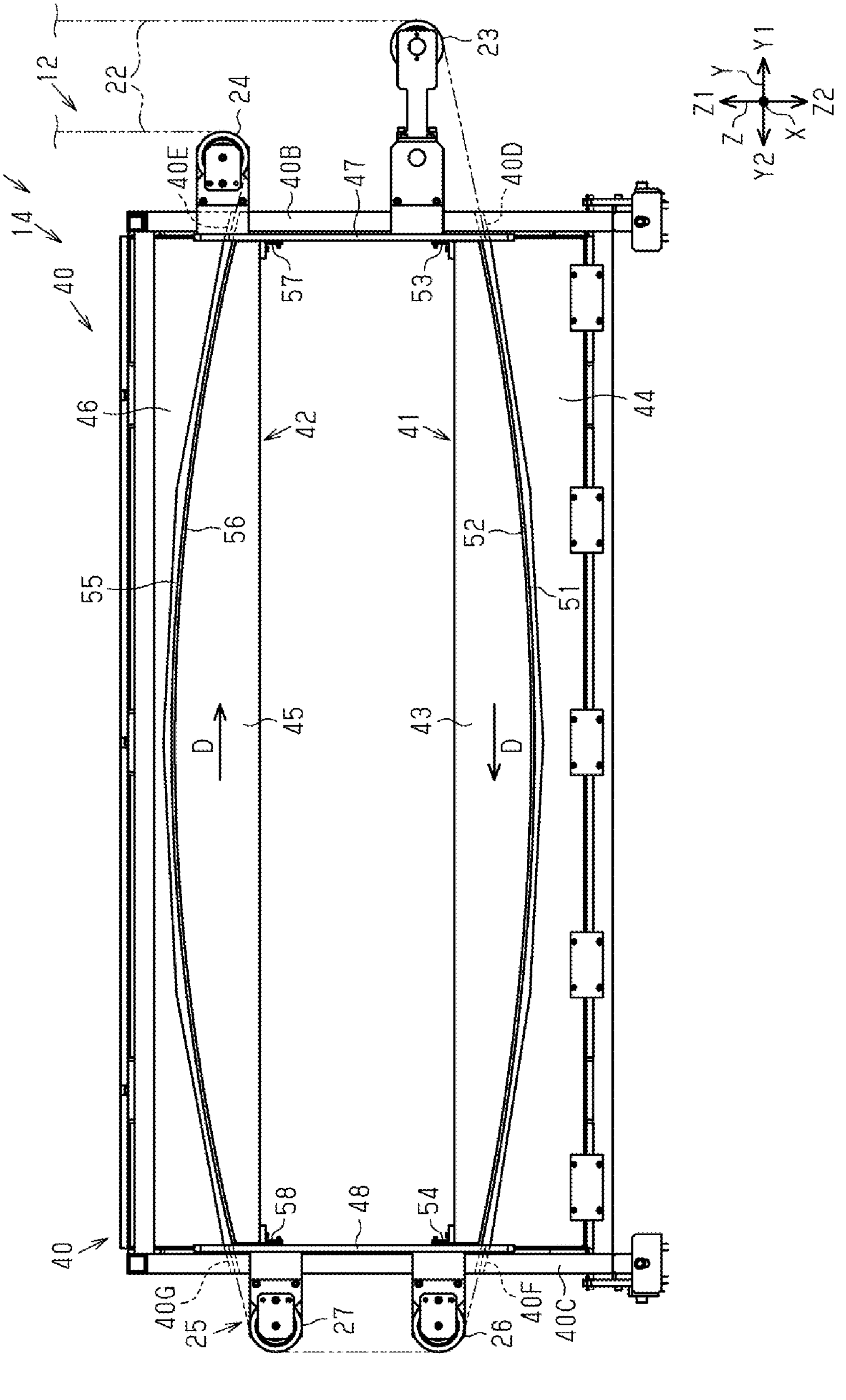
FIG. 2 is a front view illustrating a drying unit and a transport unit.

As illustrated in FIG. 2, in the drying unit 14, the housing 40 includes a first side wall 40B, and a second side wall 40C. The first side wall 40B is a wall portion on the first longitudinal direction Y1 side of the housing 40. The second side wall 40C is a wall portion in the second longitudinal direction Y2 of the housing 40. Note that in FIG. 2, illustration of the transport path 22 inside the housing 40 is omitted.

The housing 40 includes a supplying port 40D. The supplying port 40D is provided at the first side wall 40B. The supplying port 40D is an opening for transporting the medium M after printing from an outside of the housing 40 to the inside of the housing 40. In other words, the supplying port 40D is an opening for transporting the medium M after printing from an outside of a first drying unit 41 described below to an inside of the first drying unit 41.

The housing 40 includes a discharge port 40E. The discharge port 40E is provided at the first side wall 40B. The discharge port 40E is an opening for transporting the medium M after printing from the inside of the housing 40 to the outside of the housing 40. In other words, the discharge port 40E is an opening for transporting the medium M after printing from an inside of a second drying unit 42 described below to an outside of the second drying unit 42.

The housing 40 includes a first communication port 40F. The first communication port 40F is provided at the second side wall 40C. The first communication port 40F is an opening for transporting the medium M after printing from the inside of the first drying unit 41 described below to the outside of the first drying unit 41.

The housing 40 includes a second communication port 40G. The second communication port 40G is provided at the second side wall 40C. The second communication port 40G is an opening for transporting the medium M after printing from the outside of the second drying unit 42 described below to the inside of the second drying unit 42.

The drying unit 14 may include the first drying unit 41. The first drying unit 41 is provided inside the housing 40. The first drying unit 41 dries the medium M after printing transported from the supplying port 40D.

The drying unit 14 may include the second drying unit 42. The second drying unit 42 is provided inside the housing 40.

The second drying unit 42 dries the medium M after printing transported from the second communication port 40G.

The first drying unit 41 is positioned upstream the second drying unit 42 in the transport direction D. In the first drying unit 41, a direction toward the second longitudinal direction Y2 is the transport direction D. In the second drying unit 42, a direction toward the first longitudinal direction Y1 is the transport direction D.

The first drying unit 41 includes a first contact heating unit 43. That is, the drying unit 14 includes the first contact heating unit 43. The first contact heating unit 43 is provided inside the housing 40. The first contact heating unit 43 is provided at a position facing a back surface of the medium M after printing. The back surface of the medium M after printing is a surface on an opposite side to a printing surface of the medium M after printing. The first contact heating unit 43 dries the medium M after printing by coming into contact with the back surface of the medium M after printing.

The first contact heating unit 43 includes a first contact heating surface 51. The first contact heating surface 51 is a surface facing the back surface of the medium M after printing, in the first contact heating unit 43. The first contact heating surface 51 is configured to come into contact with the back surface of the medium M after printing. The first contact heating surface 51 is positioned facing in a direction opposite to a second contact heating surface 55 described below. The first contact heating surface 51 may be a surface that has an area larger than that of a support surface on which the medium M is supported in the support portion 11.

The first contact heating surface 51 is curved to have a shape protruding toward the lower Z2 side in the vertical direction Z. That is, the first contact heating surface 51 is curved to have a shape protruding toward a first non-contact heating unit 44 described below. In other words, the first contact heating surface 51 is curved to have a shape protruding toward a direction opposite to the second contact heating surface 55 described below.

The first contact heating surface 51 may be a surface formed of a metal plate material, or may be a surface formed of an aluminum plate material, for example. In particular, the first contact heating surface 51 may be configured to curve along a support member (not illustrated). Further, for the first contact heating surface 51, a radius of curvature may be adopted that increases a degree of close contact with the medium M after printing, while suppressing an increase in size in the vertical direction Z of the drying unit 14.

Additionally, a surface of the first contact heating surface 51 that comes into contact with the back surface of the medium M after printing may be subjected to electroless Ni plating. In a specific example, a thickness of the first contact heating surface 51 may be about 3 mm, and a thickness of the electroless Ni plating may be about 10 μm. In this way, the first contact heating surface 51 is configured to reduce friction force with the back surface of the medium M after printing, when coming into contact with the back surface of the medium M after printing.

The first contact heating unit 43 includes a first heater 52. The first heater 52 may be a rubber heater provided at a back surface of the first contact heating surface 51. The first heater 52 heats the first contact heating surface 51. Accordingly, the first contact heating unit 43 dries the medium M after printing coming into contact with the first contact heating surface 51.

The first contact heating unit 43 includes a first engagement portion 53, and a second engagement portion 54. The first engagement portion 53 is provided on the first longitudinal direction Y1 side of the first contact heating unit 43. The first engagement portion 53 can engage with a first support portion 47 described below. The second engagement portion 54 is provided on the second longitudinal direction Y2 side of the first contact heating unit 43. The second engagement portion 54 can engage with a second support portion 48 described below. In this manner, the first contact heating unit 43 is supported by the first support portion 47 and the second support portion 48 described later.

The first drying unit 41 may include the first non-contact heating unit 44. That is, the drying unit 14 may include the first non-contact heating unit 44. The first non-contact heating unit 44 is provided inside the housing 40. The first non-contact heating unit 44 is disposed facing the first contact heating unit 43. Particularly, the first non-contact heating unit 44 is disposed facing the first contact heating surface 51. The first non-contact heating unit 44 is disposed with the transport path 22 sandwiched between the first non-contact heating unit 44 and the first contact heating unit 43.

The first non-contact heating unit 44 is configured to blow air to the printing surface of the medium M after printing in a state of not being in contact with the printing surface of the medium M after printing. Specifically, the first non-contact heating unit 44 may include a heater (not illustrated), a blower (not illustrated), and a plurality of air blowing ports (not illustrated). The plurality of air blowing ports (not illustrated) are provided at positions facing the transport path 22. The first non-contact heating unit 44 heats internal air by the heater. The first non-contact heating unit 44 blows the heated air from a plurality of blowing nozzles by driving of the blower. In this manner, the first non-contact heating unit 44 dries the medium M after printing by blowing air to the printing surface of the medium M after printing, without coming into contact with the printing surface of the medium M after printing.

In the first drying unit 41, the first contact heating unit 43 and the first non-contact heating unit 44 are provided separated by a predetermined distance. In the first drying unit 41, the first contact heating unit 43 and the first non-contact heating unit 44 are provided sandwiching the transport path 22. As the predetermined distance, a minimum distance is adopted to increase drying efficiency of the medium M, and to reduce a size of the drying unit 14. The predetermined distance may be, for example, about 15 mm.

The second drying unit 42 includes a second contact heating unit 45. That is, the drying unit 14 may include the second contact heating unit 45. The second contact heating unit 45 is provided inside the housing 40. The second contact heating unit 45 is provided at a position facing the back surface of the medium M after printing. The second contact heating unit 45 dries the medium M after printing by coming into contact with the back surface of the medium M after printing.

The second contact heating unit 45 includes the second contact heating surface 55. The second contact heating surface 55 is a surface facing the back surface of the medium M after printing in the second contact heating unit 45. The second contact heating surface 55 is configured to come into contact with the back surface of the medium M after printing. The second contact heating surface 55 is positioned facing a direction opposite to the first contact heating surface 51. The second contact heating surface 55 may be a surface that has an area larger than that of the support surface on which the medium M is supported in the support portion 11.

The second contact heating surface 55 is curved to have a shape protruding toward the upper Z1 side in the vertical direction Z. That is, the second contact heating surface 55 is curved to have a shape protruding toward a second non-contact heating unit 46 described below. In other words, the second contact heating surface 55 is curved to have a shape protruding toward a direction opposite to the first contact heating surface 51.

The second contact heating surface 55, similar to the first contact heating surface 51, may be a surface formed of a metal plate material, or may be a surface formed of, for example, an aluminum plate material. In particular, the second contact heating surface 55 may be configured to curve along a support member (not illustrated). Further, for the second contact heating surface 55, a radius of curvature may be adopted that increases a degree of close contact with the medium M after printing, while suppressing an increase in size in the vertical direction Z of the drying unit 14.

Additionally, a surface of the second contact heating surface 55 that comes into contact with the back surface of the medium M after printing may be subjected to electroless Ni plating. In a specific example, a thickness of the second contact heating surface 55 may be about 3 mm, and a thickness of the electroless Ni plating may be about 10 μm. In this way, the second contact heating surface 55 is configured to reduce friction force with the back surface of the medium M after printing, when coming into contact with the back surface of the medium M after printing.

The second contact heating unit 45 includes a second heater 56. The second heater 56 may be a rubber heater provided at a back surface of the second contact heating surface 55. The second heater 56 heats the second contact heating surface 55. Accordingly, the second contact heating unit 45 dries the medium M after printing coming into contact with the second contact heating surface 55.

The second contact heating unit 45 includes a third engagement portion 57 and a fourth engagement portion 58. The third engagement portion 57 is provided on the first longitudinal direction Y1 side of the second contact heating unit 45. The third engagement portion 57 can engage with the first support portion 47 described below. The fourth engagement portion 58 is provided on the second longitudinal direction Y2 side of the second contact heating unit 45. The fourth engagement portion 58 can engage with the second support portion 48 described below. In this manner, the second contact heating unit 45 is supported by the first support portion 47 and the second support portion 48 described later.

The second drying unit 42 includes the second non-contact heating unit 46. That is, the drying unit 14 may include the second non-contact heating unit 46. The second non-contact heating unit 46 is provided inside the housing 40. The second non-contact heating unit 46 is disposed facing the second contact heating unit 45. In particular, the second non-contact heating unit 46 is disposed facing the second contact heating surface 55. The second non-contact heating unit 46 is disposed with the transport path 22 sandwiched between the second non-contact heating unit 46 and the second contact heating unit 45.

The second non-contact heating unit 46, similar to the first non-contact heating unit 44, is configured to blow air to the printing surface of the medium M after printing in a state of not being in contact with the printing surface of the medium M after printing. Specifically, the second non-contact heating unit 46 may include a heater (not illustrated), a blower (not illustrated), and a plurality of air blowing ports (not illustrated). The plurality of air blowing ports (not illustrated) are provided at positions facing the transport path 22. The second non-contact heating unit 46 heats internal air by the heater. The second non-contact heating unit 46 blows the heated air from a plurality of blowing nozzles by driving of the blower. In this manner, the second non-contact heating unit 46 dries the medium M after printing by blowing air to the printing surface of the medium M after printing, without coming into contact with the printing surface of the medium M after printing.

In the second drying unit 42, the second contact heating unit 45 and the second non-contact heating unit 46 are provided separated by a predetermined distance. In the second drying unit 42, the second contact heating unit 45 and the second non-contact heating unit 46 are provided sandwiching the transport path 22. As the predetermined distance, a minimum distance is adopted to increase drying efficiency of the medium M, and to reduce a size of the drying unit 14. The predetermined distance may be, for example, about 15 mm.

In this manner, in the drying unit 14, the second non-contact heating unit 46, the second contact heating unit 45, the first contact heating unit 43, and the first non-contact heating unit 44 are disposed in order from the upper Z1 side in the vertical direction Z. That is, the second non-contact heating unit 46, the second contact heating unit 45, the first contact heating unit 43, and the first non-contact heating unit 44 are provided at positions overlapping each other in the vertical direction Z. In other words, the first contact heating unit 43 is provided on the lower Z2 side in the vertical direction Z from the second contact heating unit 45.

Further, the first contact heating unit 43 is positioned upstream in the transport direction D from the second contact heating unit 45 and the second non-contact heating unit 46. The first non-contact heating unit 44 is positioned upstream in the transport direction D from the second contact heating unit 45 and the second non-contact heating unit 46. That is, the second contact heating unit 45 is provided downstream in the transport direction D from the first contact heating unit 43.

The drying unit 14 includes the first support portion 47. The first support portion 47 is provided inside the housing 40. The first support portion 47 is disposed on the first longitudinal direction Y1 side of the first contact heating unit 43 and the second contact heating unit 45. The first support portion 47 may be attached to the first side wall 40B. The first support portion 47 is configured to support the first contact heating unit 43 and the second contact heating unit 45 from the first longitudinal direction Y1 side.

The drying unit 14 includes the second support portion 48. The second support portion 48 is provided inside the housing 40. The second support portion 48 is disposed on the second longitudinal direction Y2 side of the first contact heating unit 43 and the second contact heating unit 45. The second support portion 48 may be attached to the second side wall 40C. The second support portion 48 is configured to support the first contact heating unit 43 and the second contact heating unit 45 from the second longitudinal direction Y2 side.

In this manner, the first support portion 47 is provided at one of positions sandwiching the first contact heating unit 43 and the second contact heating unit 45 in the transport direction D. The second support portion 48 is provided at another of the positions sandwiching the first contact heating unit 43 and the second contact heating unit 45 in the transport direction D. That is, the first support portion 47 and the second support portion 48 are a pair of the support portions provided at the positions sandwiching the first contact heating unit 43 and the second contact heating unit 45 in the transport direction D.

Configuration of Transport Unit 12

The transport unit 12 includes a first roller 23, and a second roller 24. The first roller 23 is a roller for transporting the medium M after printing from the outside of the first drying unit 41 to the inside of the first drying unit 41. The second roller 24 is a roller for transporting the medium M after printing from the inside of the second drying unit 42 to the outside of the second drying unit 42.

The first roller 23 and the second roller 24 may be driven rollers that corotate by friction of the medium M after printing to rotate. The first roller 23 and the second roller 24 may each be a driving roller that rotates by driving of a drive source, or may be a pair of rollers including a driven roller and a driving roller.

The transport unit 12 includes a folding unit 25. The folding unit 25 is provided downstream in the transport direction D from the first contact heating unit 43, and is provided upstream in the transport direction D from the second contact heating unit 45. The folding unit 25 is configured to transport the medium M after printing transported to the outside of the first drying unit 41, to the inside of the second drying unit 42. That is, the folding unit 25 is configured to fold back the medium M after printing that came into contact with the first contact heating surface 51 to the second contact heating surface 55. In other words, the folding unit 25 transports the medium M after printing transported toward the second longitudinal direction Y2 so as to fold the same back toward the first longitudinal direction Y1.

The folding unit 25 may include a first folding roller 26, and a second folding roller 27. The first folding roller 26 is a roller for transporting the medium M after printing transported to the outside of the first drying unit 41 to the second folding roller 27. The second folding roller 27 is a roller for transporting the medium M after printing transported by the first folding roller 26 to the inside of the second drying unit 42.

The first folding roller 26 and the second folding roller 27 may be driven rollers that corotate by friction of the medium M after printing to rotate. The first folding roller 26 and the second folding roller 27 may each be a driving roller that rotates by driving of a drive source, or may be a pair of rollers including a driven roller and a driving roller.

The first roller 23 is disposed so as to transport the medium M after printing on the upper Z1 side of the supply port 40D in the vertical direction Z. The first folding roller 26 is disposed so as to transport the medium M after printing on the upper Z1 side of the first communication port 40F in the vertical direction Z. That is, the first roller 23 and the first folding roller 26 are disposed at positions for bringing the back surface of the medium M after printing in the first drying unit 41 into contact with the first contact heating surface 51. As a result, in the first drying unit 41, the medium M after printing is brought into a state where the back surface is pressed against the first contact heating surface 51, and tension is applied in the transport direction D. In this manner, the first roller 23 and the first folding roller 26 are disposed at positions for bringing the medium M after printing in the first drying unit 41 into contact with the first contact heating unit 43, and not bringing the medium M after printing in the first drying unit 41 into contact with the first non-contact heating unit 44.

The second roller 24 is disposed such that a bottom end portion of the roller transports the medium M after printing on the lower Z2 side in the vertical direction Z of the discharge port 40E. The second folding roller 27 is disposed so as to transport the medium M after printing on the lower Z2 side of the second communication port 40G in the vertical direction Z. That is, the second roller 24 and the second folding roller 27 are disposed at positions for bringing the medium M after printing in the second drying unit 42 into contact with the second contact heating surface 55. As a result, in the second drying unit 42, the medium M after printing is brought into a state where the back surface is pressed against the second contact heating surface 55, and tension is applied in the transport direction D. In this manner, the second roller 24 and the second folding roller 27 are disposed at positions for bringing the medium M after printing in the second drying unit 42 into contact with the second contact heating unit 45, and not bringing the medium M after printing in the second drying unit 42 into contact with the second non-contact heating unit 46.

In the present exemplary embodiment, the folding unit 25 and the second side wall 40C are provided inside the housing 40, but the present disclosure is not limited thereto. For example, the second side wall 40C may be an outermost covering of the housing 40, and the folding unit 25 may be provided outside the housing 40. The first roller 23 and the second roller 24 are provided outside the housing 40, but are not limited thereto. For example, the first side wall 40B need not be an outermost covering of the housing 40, and at least one of the first roller 23 or the second roller 24 may be provided inside the housing 40. The housing 40 may include an air inlet (not illustrated) for incorporating outside air therein, and an exhaust port (not illustrated) for exhausting internal air to the outside.

Radius of Curvature of Each Contact Heating Surface

In such a configuration, the first contact heating surface 51 has a radius of curvature larger than that of the second contact heating surface 55, and has a gentle arc shape. In other words, a curvature of the first contact heating surface 51 is smaller than that of the second contact heating surface 55. As a specific example, the first contact heating surface 51 may have a radius of curvature of 3700 mm, and the second contact heating surface 55 may have a radius of curvature of 3000 mm, but the present disclosure is not limited thereto.

The second contact heating unit 45 is provided downstream in the transport direction D from the first contact heating unit 43. Accordingly, the second contact heating unit 45 dries the medium M after printing dried by the first contact heating unit 43. That is, the second contact heating unit 45, as compared to the first contact heating unit 43, dries the medium M having a less liquid water content. For this reason, the second contact heating unit 45, as compared to the first contact heating unit 43, dries the medium M having a higher temperature.

As described above, when paper is adopted as an example of the medium M, it was found that, as compared to the first contact heating surface 51, the medium M tends to contract more easily along the transport direction D on the second contact heating surface 55. Therefore, by making the radius of curvature of the second contact heating surface 55 smaller than the radius of curvature of the first contact heating surface 51, it is possible to increase tension of the medium M in the transport direction D. Therefore, it is possible to suppress the contraction of the medium M along the transport direction D.

Figure 3:
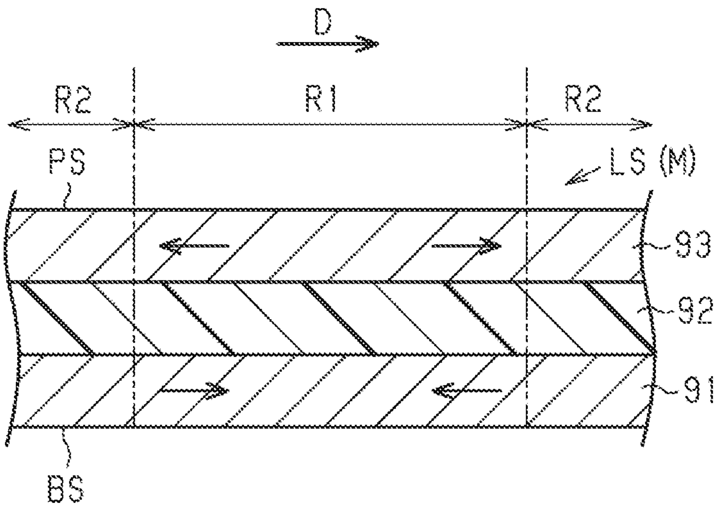
FIG. 3 is a cross-sectional view schematically illustrating a label sheet.

In particular, as illustrated in FIG. 3, when a label sheet LS is adopted as an example of the medium M, by making the radius of curvature of the second contact heating surface 55 smaller than the radius of curvature of the first contact heating surface 51, a remarkable effect is achieved.

The label sheet LS includes a liner layer 91, an adhesive layer 92, and a face layer 93. In the label sheet LS, the liner layer 91, the adhesive layer 92, and the face layer 93 are stacked.

The liner layer 91 is, for example, a mount of the label sheet LS. The liner layer 91 serves as a back surface BS of the medium M after printing. For example, the liner layer 91 may be made of paper. The face layer 93 is a layer on which printing is performed by the printing unit 13, for example. The face layer 93 serves as a printing surface PS of the medium M after printing. The face layer 93 may be made of, for example, film.

The adhesive layer 92 is provided between the liner layer 91 and the face layer 93. The adhesive layer 92 may be a layer made of, for example, an adhesive. The adhesive layer 92 is a layer for attaching the face layer 93 to the liner layer 91.

The label sheet LS is heated by the drying unit 14 in a first region R1. The label sheet LS is not heated by the drying unit 14 in a second region R2 other than the first region R1. For this reason, the adhesive layer 92 is in a state of not flowing in the second region R2, but becomes flowable in the first region R1 by heating of the drying unit 14. The face layer 93 is made of, for example, film, and in the first region R1, is applied with force so as to expand along the transport direction D by the heating of the drying unit 14. On the other hand, the liner layer 91 is made of paper, and in the first region R1, is applied with force so as to contract along the transport direction D by the heating of the drying unit 14.

As described above, in the label sheet LS, in the first region R1, by the heating of the drying unit 14, the adhesive layer 92 becomes flowable, the face layer 93 is applied with force so as to expand along the transport direction D, and the liner layer 91 is applied with force so as to contract. As a result, there is a tendency that, in the first region R1, in the label sheet LS, a part of the face layer 93 is lifted from the liner layer 91, and a wrinkle occurs in the label sheet LS. In particular, it was found that, as compared to the first contact heating surface 51, a wrinkle tends to occur in the label sheet LS on the second contact heating surface 55.

Therefore, by making the radius of curvature of the second contact heating surface 55 smaller than the radius of curvature of the first contact heating surface 51, it is possible to increase tension of the label sheet LS in the transport direction D. Therefore, the contraction along the transport direction D in the label sheet LS can be suppressed.

Operations of First Exemplary Embodiment

Operations of the first exemplary embodiment will be described.

In the printing apparatus 10, when a printing instruction is input, the medium M is transported along the transport path 22 by the transport unit 12. The medium M transported along the transport path 22 is supported by the support portion 11 in the printing area PA. Printing is performed by the printing unit 13 on the medium M supported by the support portion 11. The medium M after printing is transported to the drying unit 14. The medium M after printing transported to the drying unit 14 is dried by the drying unit 14.

Specifically, in the first drying unit 41, the medium M after printing is transported so that the back surface of the medium M after printing comes into contact with the first contact heating surface 51, and the printing surface of the medium M after printing does not come into contact with the first non-contact heating unit 44. In particular, the medium M after printing is disposed such that the back surface of the medium M after printing is pressed against the curved first contact heating surface 51. Thus, the medium M after printing is dried by the first contact heating unit 43 and the first non-contact heating unit 44. The medium M after printing dried by the first drying unit 41 is transported from the first drying unit 41 to the second drying unit 42 by the folding unit 25.

In the second drying unit 42, the medium M after printing is transported so that the back surface of the medium M after printing comes into contact with the second contact heating surface 55, and the printing surface of the medium M after printing does not come into contact with the second non-contact heating unit 46. In particular, the medium M after printing is disposed such that the back surface of the medium M after printing is pressed against the curved second contact heating surface 55. Thus, the medium M after printing is dried by the second contact heating unit 45 and the second non-contact heating unit 46.

In particular, the second contact heating surface 55 is configured to have the radius of curvature smaller than that of the first contact heating surface 51. The second contact heating surface 55 is positioned downstream in the transport direction D from the first contact heating surface 51. For this reason, as compared to the first contact heating surface 51, the medium M having the lower liquid water content is disposed at the second contact heating surface 55. That is, as compared to the first contact heating surface 51, the medium M having the higher temperature is disposed at the second contact heating surface 55. As described above, the second contact heating surface 55 is configured to have the radius of curvature smaller than that of the first contact heating surface 51, so that force pressed in a vertical direction against a curved surface can be increased for the second contact heating surface 55, as compared to the first contact heating surface 51. Accordingly, the contraction in the transport direction D of the medium M can be suppressed.

Effects of First Exemplary Embodiment

Effects of the first exemplary embodiment will be described.

(1) The drying unit 14 includes the housing 40, the first contact heating unit 43 provided inside the housing 40, and the second contact heating unit 45 provided downstream in the transport direction D from the first contact heating unit 43 inside the housing 40. The first contact heating unit 43 includes the first contact heating surface 51 configured to come into contact with the back surface of the medium M after printing. The second contact heating unit 45 includes the second contact heating surface 55 configured to come into contact with the back surface of the medium M after printing. The first contact heating surface 51 is curved to have the shape protruding in the direction opposite to the second contact heating surface 55, and the second contact heating surface 55 is curved to have the shape protruding in the direction opposite to the first contact heating surface 51. Thus, the medium M after printing can be brought into contact with the first contact heating surface 51 and the second contact heating surface 55 while being pressed. This makes it possible to use both the first contact heating unit 43 and the second contact heating unit 45, and increase the degree of close contact between the first contact heating surface 51 and the second contact heating surface 55 and the printing medium M, thereby improving the drying efficiency of the medium M after printing. Therefore, the quality of the medium M after printing can be improved, in association with the drying of the medium M after printing.

(2) In particular, the radius of curvature of the first contact heating surface 51 is larger than that of the second contact heating surface 55. For this reason, the medium M after printing can be brought into contact with the second contact heating surface 55 positioned downstream the first contact heating surface 51, while being pressed with larger force, as compared to the first contact heating surface 51. Accordingly, it is possible to suppress the contraction of the medium M after printing along the transport direction D at the second contact heating surface 55 at which the temperature of the medium M after printing is likely to increase. Therefore, quality of the medium after printing can be improved, in association with the drying of the medium M after printing.

(3) The folding unit 25 is provided downstream in the transport direction D from the first contact heating unit 43, and is provided upstream in the transport direction D from the second contact heating unit 45. The folding unit 25 is configured to fold back the medium M after printing that came into contact with the first contact heating surface 51 to the second contact heating surface 55. The first contact heating surface 51 and the second contact heating surface 55 are the surfaces facing in the directions opposite to each other. Thus, by using the folding unit 25, the first contact heating surface 51 and the second contact heating surface 55 can be disposed so as not to be adjacent to each other along the transport direction D. Thus, an increase in a size of the drying unit 14 in the transport direction D can be suppressed.

(4) The first contact heating surface 51 and the second contact heating surface 55 are the surfaces formed of the metal plate material. Therefore, the drying efficiency of the medium M can be improved by using the first contact heating surface 51 and the second contact heating surface 55 formed of the metal plate material having high thermal conductivity. Therefore, quality of the medium M after printing can be improved, in association with the drying of the medium M after printing.

(5) The first contact heating surface 51 and the second contact heating surface 55 are the surfaces subjected to electroless plating. Thus, even when the degree of close contact between the first contact heating surface 51 and the second contact heating surface 55 and the medium M after printing is increased, friction force between the first contact heating surface 51 and the second contact heating surface 55 and the medium M after printing can be reduced. In this way, damage to the medium M after printing coming into contact with the first contact heating surface 51 and the second contact heating surface 55 can be suppressed. Additionally, in addition to this, even without providing a mechanism for separating the medium M after printing from the first contact heating surface 51 and the second contact heating surface 55, the medium M after printing coming into contact with the first contact heating surface 51 and the second contact heating surface 55 can be smoothly transported. Therefore, quality of the medium M after printing can be improved, in association with the drying of the medium M after printing.

(6) The drying unit 14 includes the first non-contact heating unit 44 and the second non-contact heating unit 46 that blow air to the printing surface of the medium M after printing in the state of not being in contact with the printing surface of the medium M after printing. The first non-contact heating unit 44 is provided at a position facing the first contact heating surface 51. The second non-contact heating unit 46 is provided at a position facing the second contact heating surface 55. This makes it possible to improve the drying efficiency of the medium M after printing by using the first contact heating unit 43, the second contact heating unit 45, the first non-contact heating unit 44, and the second non-contact heating unit 46. Therefore, quality of the medium M after printing can be improved, in association with the drying of the medium M after printing.

Modified Examples

The embodiment described above may be modified as follows. The embodiment and modified examples thereof to be described below may be implemented in combination within a range in which a technical contradiction does not arise.

In the above-described exemplary embodiment, for example, each of the first contact heating surface 51 and the second contact heating surface 55 may be subjected to electroless plating different from the electroless Ni plating on a surface that comes into contact with the back surface of the medium M after printing. That is, each of the first contact heating surface 51 and the second contact heating surface 55 may be subjected to electroless plating on the surface that comes into contact with the back surface of the medium M after printing. This makes it possible to improve the quality of the medium M after printing in association with the drying of the medium M after printing.

In the above-described exemplary embodiment, for example, each of the first contact heating surface 51 and the second contact heating surface 55 may be subjected to a fluorine coating process on the surface that comes into contact with the back surface of the medium M after printing. This makes it possible to improve the quality of the medium M after printing in association with the drying of the medium M after printing.

In the above-described exemplary embodiment, for example, each of the first contact heating surface 51 and the second contact heating surface 55 may be subjected to an embossing process on the surface. This makes it possible to improve the quality of the medium M after printing in association with the drying of the medium M after printing.

In the above-described exemplary embodiment, for example, each of the first contact heating surface 51 and the second contact heating surface 55 may be further subjected to electroless plating on the surface subjected to the embossing process, or may further be subjected to the fluorine coating process on the surface subjected to the embossing process. This makes it possible to improve the quality of the medium M after printing in association with the drying of the medium M after printing.

In the above-described exemplary embodiment, for example, the first drying unit 41 and the second drying unit 42 may be disposed overlapping each other in a horizontal direction. That is, the first drying unit 41 and the second drying unit 42 may be disposed overlapping each other in the longitudinal direction Y. In such a case, for example, the vertical direction Z of FIG. 2 is the longitudinal direction Y, and the longitudinal direction Y of FIG. 2 is the vertical direction Z. Specifically, for example, the upside Z1 in the vertical direction Z of FIG. 2 is the second longitudinal direction Y2, the downside Z2 in the vertical direction Z of FIG. 2 is the first longitudinal direction Y1, the first longitudinal direction Y1 of FIG. 2 is the upside Z1 in the vertical direction Z, and the second longitudinal direction Y2 of FIG. 2 is the downside Z2 in the vertical direction Z.

In the above-described exemplary embodiment, for example, at least one of the first non-contact heating unit 44 or the second non-contact heating unit 46 need not be provided. That is, the non-contact heating unit may be provided at least at one of the position facing the first contact heating surface 51 or the position facing the second contact heating surface 55, or need not be provided. Further, at least one of the first non-contact heating unit 44 or the second non-contact heating unit 46 corresponds to an example of the non-contact heating unit.

In the above-described exemplary embodiment, for example, the first support portion 47 may be configured with a plurality of members. For example, the first support portion 47 may be divided into a member that supports the first contact heating unit 43, and a member that supports the second contact heating unit 45. For example, the second support portion 48 may be configured with a plurality of members. For example, the second support portion 48 may be divided into a member that supports the first contact heating unit 43, and a member that supports the second contact heating unit 45.

In the above-described exemplary embodiment, for example, the control unit 17 may adjust control contents by the drying unit 14. As a specific example, the control unit 17 may be capable of switching whether to drive each of the first contact heating unit 43, the first non-contact heating unit 44, the second contact heating unit 45, and the second non-contact heating unit 46 or not based on an instruction input by a user's operation. For example, the control unit 17 may be capable of adjusting a drying time for drying the medium M after printing, based on an instruction input by a user's operation. For example, the control unit 17 may be capable of setting a drying temperature serving as a reference for drying, based on an instruction input by a user's operation. For example, any drying temperature from 50 to 100 degrees may be settable.

In the above-described exemplary embodiment, the serial type printer is adopted as the printing apparatus 10, but the present disclosure is not limited thereto. For example, a lateral type printer or a line type printer may be adopted as the printing apparatus 10. The lateral type printer is a printer in which a carriage can move in two directions of a main scanning direction and a sub scanning direction. The line type printer is a printer including a plurality of nozzles arranged at a constant pitch in the width direction X, and capable of simultaneously discharging liquid over a width of the medium M.

The medium M is not limited to the medium fed from the roll body R. The medium M may be paper, resin film or sheet, resin-metal composite film, laminated film, woven fabric, non-woven fabric, metal foil, metal film, ceramic sheet, or the like. Further, the medium M may also be a towel, or a clothing such as a shirt.

The printing apparatus 10 is not limited to the printer, or may be a multifunction device including a scanner mechanism and a copy function in addition to the printing function.

The phrase "at least one" used herein means one or more of desired options. By way of example, the expression "at least one" used herein means only one option or both two options when the number of options is two. As another example, the expression "at least one" used herein means one option alone or a combination of two or more optional options when the number of options is three or more.

Supplementary Note

Hereinafter, technical concepts and effects thereof that are understood from the above-described embodiments and modified examples will be described.

(A) A printing apparatus includes a transport unit configured to transport a medium in a transport direction, a printing unit configured to perform printing on the medium by discharging liquid onto the medium transported by the transport unit, and a drying unit configured to dry the medium after printing on which printing was performed by the printing unit, wherein the drying unit includes a housing, a first contact heating unit provided inside the housing, and a second contact heating unit provided downstream in the transport direction from the first contact heating unit inside the housing, the first contact heating unit includes a first contact heating surface facing a back surface of the medium after printing and configured to come into contact with the back surface of the medium after printing, the back surface of the medium after printing being opposite to a printing surface of the medium after printing, the second contact heating unit includes a second contact heating surface facing the back surface of the medium after printing and configured to come into contact with the back surface of the medium after printing, the transport unit includes a folding unit provided downstream in the transport direction from the first contact heating unit and upstream in the transport direction from the second contact heating unit, the folding unit is configured to fold the medium after printing coming into contact with the first contact heating surface to the second contact heating surface, the first contact heating surface and the second contact heating surface are surfaces facing in directions opposite to each other, the first contact heating surface is curved to have a shape protruding in a direction opposite to the second contact heating surface, the second contact heating surface is curved to have a shape protruding in a direction opposite to the first contact heating surface, and the first contact heating surface has a radius of curvature larger than that of the second contact heating surface.

According to this configuration, the medium after printing can be brought into contact with the first contact heating surface and the second contact heating surface while being pressed. Thus, a degree of close contact between the first contact heating surface and the second contact heating surface and the medium after printing can be increased, thereby improving drying efficiency of the medium after printing. Therefore, quality of the medium after printing can be improved, in association with the drying of the medium after printing.

Further, in addition to this, the medium after printing can be brought into contact with the second contact heating surface positioned downstream the first contact heating surface, while being pressed with larger force, as compared to the first contact heating surface. Accordingly, it is possible to suppress contraction of the medium after printing along the transport direction at the second contact heating surface at which a temperature of the medium after printing is likely to increase. Therefore, quality of the medium after printing can be improved, in association with the drying of the medium after printing.

Further, in addition to this, by using the folding unit, the first contact heating surface and the second contact heating surface can be disposed so as not to be adjacent to each other along the transport direction. Thus, an increase in a size of the drying unit in the transport direction can be suppressed.

(B) In the printing apparatus, the first contact heating surface and the second contact heating surface may be surfaces formed of a metal plate material.

According to this configuration, the drying efficiency of the medium can be improved by using the first contact heating surface and the second contact heating surface formed of the metal plate material having high thermal conductivity. Therefore, quality of the medium after printing can be improved, in association with the drying of the medium after printing.

(C) In the printing apparatus, the first contact heating surface and the second contact heating surface may be surfaces subjected to electroless plating.

According to this configuration, friction force between the first contact heating surface and the second contact heating surface and the medium after printing can be reduced. In this way, damage to the medium after printing coming into contact with the first contact heating surface and the second contact heating surface can be suppressed, and the medium after printing coming into contact with the first contact heating surface and the second contact heating surface can be smoothly transported. Therefore, quality of the medium after printing can be improved, in association with the drying of the medium after printing.

(D) In the printing apparatus, the electroless plating may be electroless Ni plating.

According to this configuration, friction force between the first contact heating surface and the second contact heating surface and the medium after printing can be reduced. In this way, damage to the medium after printing coming into contact with the first contact heating surface and the second contact heating surface can be suppressed, and the medium after printing coming into contact with the first contact heating surface and the second contact heating surface can be smoothly transported. Therefore, quality of the medium after printing can be improved, in association with the drying of the medium after printing.

(E) In the printing apparatus, the first contact heating surface and the second contact heating surface may be surfaces subjected to an embossing process.

According to this configuration, friction force between the first contact heating surface and the second contact heating surface and the medium after printing can be reduced. In this way, damage to the medium after printing coming into contact with the first contact heating surface and the second contact heating surface can be suppressed, and the medium after printing coming into contact with the first contact heating surface and the second contact heating surface can be smoothly transported. Therefore, quality of the medium after printing can be improved, in association with the drying of the medium after printing.

(F) In the printing apparatus, the first contact heating surface and the second contact heating surface may be surfaces subjected to electroless plating treatment.

According to this configuration, friction force between the first contact heating surface and the second contact heating surface and the medium after printing can be reduced. In this way, damage to the medium after printing coming into contact with the first contact heating surface and the second contact heating surface can be suppressed, and the medium after printing coming into contact with the first contact heating surface and the second contact heating surface can be smoothly transported. Therefore, quality of the medium after printing can be improved, in association with the drying of the medium after printing.

(G) In the printing apparatus, the first contact heating surface and the second contact heating surface may be surfaces subjected to fluorine coating treatment.

According to this configuration, friction force between the first contact heating surface and the second contact heating surface and the medium after printing can be reduced. In this way, damage to the medium after printing coming into contact with the first contact heating surface and the second contact heating surface can be suppressed, and the medium after printing coming into contact with the first contact heating surface and the second contact heating surface can be smoothly transported. Therefore, quality of the medium after printing can be improved, in association with the drying of the medium after printing.

(H) In the printing apparatus, the first contact heating surface and the second contact heating surface may be surfaces formed of aluminum.

According to this configuration, friction force between the first contact heating surface and the second contact heating surface and the medium after printing can be reduced. In this way, damage to the medium after printing coming into contact with the first contact heating surface and the second contact heating surface can be suppressed, and the medium after printing coming into contact with the first contact heating surface and the second contact heating surface can be smoothly transported. Therefore, quality of the medium after printing can be improved, in association with the drying of the medium after printing.

(I) In the printing apparatus, the drying unit may include a non-contact heating unit configured to blow air to the printing surface of the medium after printing in a state of not being in contact with the printing surface of the medium after printing, and the non-contact heating unit may be provided at least at one of a position facing the first contact heating surface or a position facing the second contact heating surface.

According to this configuration, it is possible to improve the drying efficiency of the medium by using the first contact heating unit, the second contact heating unit, and the non-contact heating unit. Therefore, quality of the medium after printing can be improved, in association with the drying of the medium after printing.

(J) In the printing apparatus, the first contact heating unit and the second contact heating unit may be provided at positions overlapping each other in a vertical direction, and the first contact heating unit may be provided below the second contact heating unit in the vertical direction. According to this configuration, the same effects as those of (A) are obtained.

What is claimed is:

1. A printing apparatus, comprising:

a transport unit configured to transport a medium in a transport direction;

a printing unit configured to perform printing on the medium by discharging liquid onto the medium transported by the transport unit; and a drying unit configured to dry the medium after printing on which printing was performed by the printing unit, wherein the drying unit includes:

a housing, a first contact heating unit provided inside the housing, and a second contact heating unit provided downstream in the transport direction from the first contact heating unit inside the housing, the first contact heating unit includes a first contact heating surface facing a back surface of the medium after printing and configured to come into contact with the back surface of the medium after printing, the back surface of the medium after printing being opposite to a printing surface of the medium after printing, the second contact heating unit includes a second contact heating surface facing the back surface of the medium after printing and configured to come into contact with the back surface of the medium after printing, the transport unit includes a folding unit provided downstream in the transport direction from the first contact heating unit and upstream in the transport direction from the second contact heating unit, the folding unit is configured to fold the medium after printing coming into contact with the first contact heating surface to the second contact heating surface, the first contact heating surface and the second contact heating surface are surfaces facing in directions opposite to each other, the first contact heating surface is curved to have a shape protruding in a direction opposite to the second contact heating surface, the second contact heating surface is curved to have a shape protruding in a direction opposite to the first contact heating surface, and the first contact heating surface has a radius of curvature larger than that of the second contact heating surface.

2. The printing apparatus according to claim 1, wherein the first contact heating surface and the second contact heating surface are surfaces formed of a metal plate material.

3. The printing apparatus according to claim 2, wherein the first contact heating surface and the second contact heating surface are surfaces subjected to electroless plating.

4. The printing apparatus according to claim 3, wherein the electroless plating is electroless Ni plating.

5. The printing apparatus according to claim 2, wherein the first contact heating surface and the second contact heating surface are surfaces subjected to an embossing process.

6. The printing apparatus according to claim 5, wherein the first contact heating surface and the second contact heating surface are surfaces subjected to electroless plating treatment.

7. The printing apparatus according to claim 2, wherein the first contact heating surface and the second contact heating surface are surfaces subjected to fluorine coating treatment.

8. The printing apparatus according to claim 2, wherein the first contact heating surface and the second contact heating surface are surfaces formed of aluminum.

9. The printing apparatus according to claim 1, wherein the drying unit includes a non-contact heating unit configured to blow air to the printing surface of the medium after printing in a state of not being in contact with the printing surface of the medium after printing and the non-contact heating unit is provided at least at one of a position facing the first contact heating surface or a position facing the second contact heating surface.

10. The printing apparatus according to claim 1, wherein the first contact heating unit and the second contact heating unit are provided at positions overlapping each other in a vertical direction and the first contact heating unit is provided below the second contact heating unit in the vertical direction.

* * * * *